(12) United States Patent
Cohen et al.

(10) Patent No.: US 11,907,126 B2
(45) Date of Patent: Feb. 20, 2024

(54) PROCESSOR WITH MULTIPLE OP CACHE PIPELINES

(71) Applicant: ADVANCED MICRO DEVICES, INC., Santa Clara, CA (US)

(72) Inventors: Robert B. Cohen, Austin, TX (US); Tzu-Wei Lin, Austin, TX (US); Anthony J. Bybell, Austin, TX (US); Sudherssen Kalaiselvan, Santa Clara, CA (US); James Mossman, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/116,950

(22) Filed: Dec. 9, 2020

(65) Prior Publication Data

US 2022/0100663 A1 Mar. 31, 2022

Related U.S. Application Data

(60) Provisional application No. 63/083,435, filed on Sep. 25, 2020.

(51) Int. Cl.
*G06F 9/38* (2018.01)
*G06F 12/0855* (2016.01)

(52) U.S. Cl.
CPC ........ *G06F 12/0855* (2013.01); *G06F 9/3808* (2013.01); *G06F 9/3814* (2013.01); *G06F 2212/60* (2013.01)

(58) Field of Classification Search
CPC ............................. G06F 9/3808; G06F 9/3814
See application file for complete search history.

(56) References Cited

U.S. PATENT DOCUMENTS

| | | | |
|---|---|---|---|
| 6,079,014 A | 6/2000 | Papworth et al. | |
| 2002/0049892 A1 | 4/2002 | Saulsbury et al. | |
| 2008/0148089 A1 | 6/2008 | Luick | |
| 2009/0235051 A1 | 9/2009 | Codrescu et al. | |
| 2020/0210070 A1* | 7/2020 | Durham | G06F 12/1491 |
| 2020/0285466 A1* | 9/2020 | Kotra | G06F 9/223 |
| 2021/0081575 A1* | 3/2021 | Saileshwar | G06F 8/41 |
| 2021/0342156 A1* | 11/2021 | Eyole | G06F 9/3017 |

FOREIGN PATENT DOCUMENTS

WO 2012038713 A1 3/2012

OTHER PUBLICATIONS

International Search Report and Written Opinion dated Jan. 3, 2022 for PCT/US2021/051046, 10 pages.
International Preliminary Report on Patentability issued in Application No. PCT/US2021/051046, dated Apr. 6, 2023, 7 pages.

* cited by examiner

*Primary Examiner* — John M Lindlof

(57) ABSTRACT

A processor employs a plurality of op cache pipelines to concurrently provide previously decoded operations to a dispatch stage of an instruction pipeline. In response to receiving a first branch prediction at a processor, the processor selects a first op cache pipeline of the plurality of op cache pipelines of the processor based on the first branch prediction, and provides a first set of operations associated with the first branch prediction to the dispatch queue via the selected first op cache pipeline.

19 Claims, 3 Drawing Sheets

PROCESSOR WITH MULTIPLE OP CACHE PIPELINES

BACKGROUND

To improve efficiency and instruction throughput, a modern processor typically supports instruction processing parallelism, wherein the processor concurrently performs, during a given processor cycle, specified processing tasks for different instructions of a received instruction stream. For example, many processors employ multiple execution units that concurrently execute operations for different instructions, thereby reducing the overall time required to execute the different instructions. However, implementing parallelism prior to the execution stages of a processor presents additional challenges. Some processors employ decode units that decode multiple instructions concurrently, but circuit area and power considerations limit the size and efficiency of these decode units.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
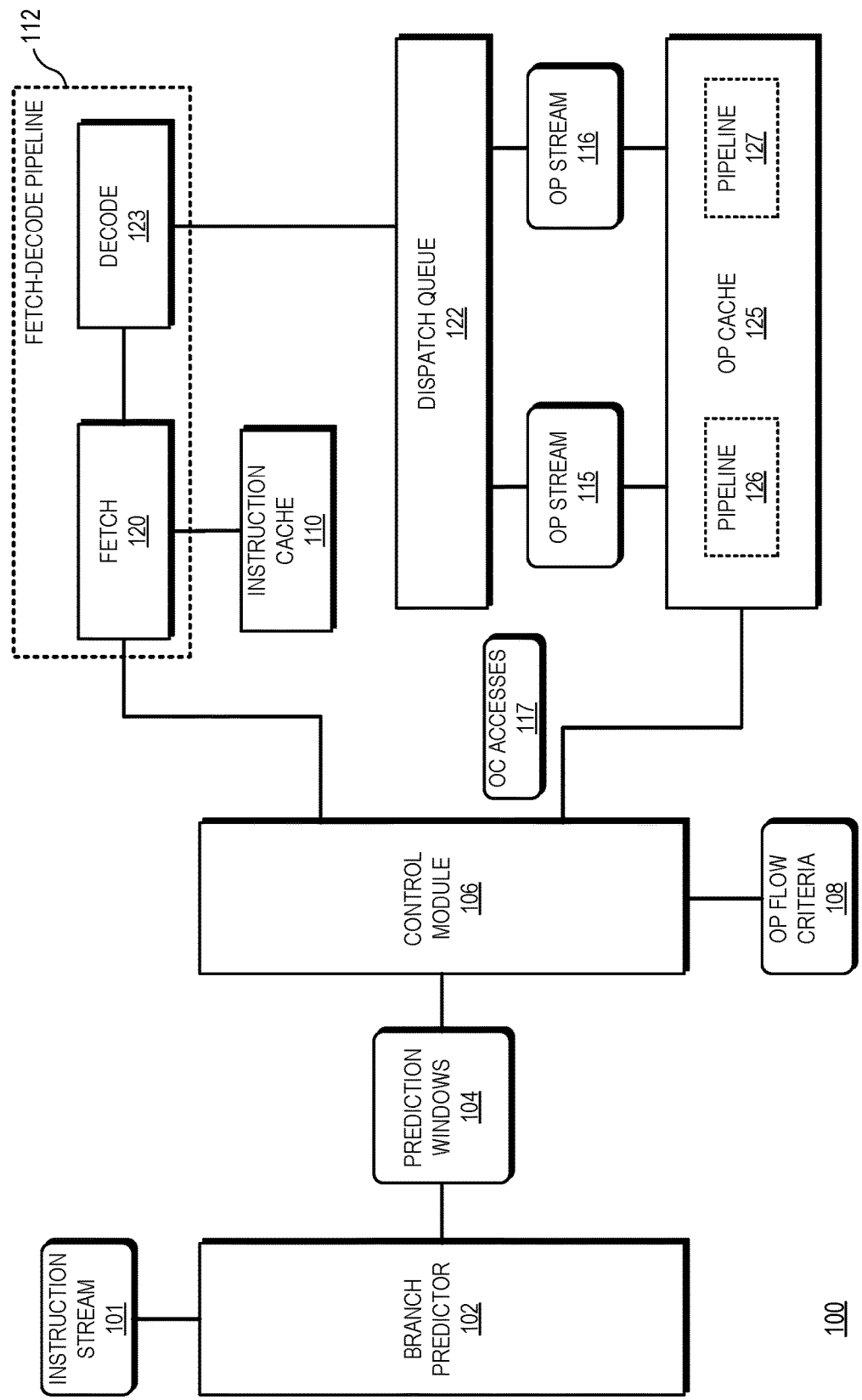
FIG. 1 is a block diagram of a processor employing a plurality of op cache pipelines that concurrently provide operations from a cache based on branch predictions in accordance with some embodiments.

To enhance instruction throughput, some processors employ an operations, or op, cache that stores operations previously decoded from executing instructions. For example, in some embodiments the op cache stores previously decoded operations associated with sets of instructions referred to as prediction windows, wherein each prediction window is associated with either 1) a branch target that represents the first instruction of the prediction window or 2) an instruction that follows a previous prediction window, because the previous window concluded before reaching a branch instruction. Each prediction window is defined by the initial instruction of the window, such as a branch target, and a defined final instruction of the window, such as another branch instruction, an instruction at a specified memory address (e.g. an instruction at an end of an instruction cache line associated with the initial instruction, and the like). The op cache includes entries that store decoded instructions for at least a subset of the prediction windows. The op cache thus provides a way to quickly generate decoded operations for prediction windows that are frequently executed by the processor within a relatively short amount of time.

However, conventional op caches typically cannot support parallel provision of operations for different prediction windows, thereby limiting processor efficiency. In particular, op cache entries are not always aligned with prediction windows. For example, in some cases a prediction window spans multiple op cache entries, while in other cases a single op cache entry includes decoded instructions for multiple prediction windows and multiple instruction cache lines. In some cases, op cache entries contain an integral number of instructions and therefore have instruction starts and ends as their boundaries whereas for at least some types of prediction windows an instruction crosses the instruction cache line boundaries and the boundaries of the prediction window. Because of the differences in the boundaries of prediction windows, instruction cache lines, and op cache entries, a conventional op cache includes only a single op cache pipeline to provide decoded instructions.

FIGS. 1-5 illustrate techniques for a processor employing a plurality of op cache pipelines by identifying prediction windows (e.g., branch prediction windows) that correspond to known or well-defined op-cache entries. For example, in some embodiments the processor includes a branch predictor that generates branch prediction windows, with each branch prediction window including a start address and an end address. For some prediction windows, referred to as non-sequential exit windows, the end address is an address corresponding to a branch instruction. In other words, a non-sequential exit window ends with an address corresponding to the end of a branch instruction. For non-sequential exit windows, the start of the next branch prediction window corresponds to the branch target address of the branch instruction. Other prediction windows, referred to as sequential exit windows, end with an address corresponding to a specified boundary, such as an end of an instruction cache line corresponding to the branch prediction window, which in some cases is not aligned with the end of an instruction. For sequential exit windows, the start of the next branch prediction window corresponds to the sequential address that follows the specified boundary.

In some embodiments, a control module directs prediction window flow down op cache or fetch-decode pipelines. The control module stores state information describing op cache entries, such as start and end pointers, and uses the state information to generate the sequence of op cache entry accesses necessary to retrieve and provide the decoded instructions for incoming prediction windows from the op cache. In some embodiments, the control module assigns this ordered list of op cache accesses in parallel to a plurality of op cache pipelines which then concurrently provide the decoded instructions from the accesses to those op cache entries. By assigning the ordered list of accesses (e.g., one access per pipeline per clock) across an ordered set of op cache pipelines, the control module generates an ordered parallel output flow that is divided among the different op cache pipelines, improving operation throughput and overall processing efficiency while maintaining the order of the retrieved operations.

In some embodiments, when the op cache does not contain a portion of the prediction stream, the control module controls a fetch-decode pipeline to provide the decoded instructions from the missing portion to a dispatch queue. This fetch-decode pipeline proceeds independently of op cache pipeline fetches. The processor includes an ordering mechanism to assure that a dispatch queue provides the decoded instruction stream in program order. The control module continues to process the incoming set of prediction windows and build queues of work (accesses) for both the op cache and fetch-decode pipelines based on, for example, op cache residency and entry content. The op cache and fetch-decode pipelines concurrently provide the decoded instructions from access assignments flowing from those work queues.

In some embodiments, the control module causes the prediction window which follows a sequential exit prediction window to always be assigned to the same op cache pipeline, such that all such streams of sequential-exit prediction windows will flow down a same op cache pipeline. This allows the op cache entry accessed in one clock to provide the address of the last instruction byte which it contains and thereby identify the start address of the next sequential op cache entry which will be accessed in the next clock. In such embodiments only prediction windows following a non-sequential-exit window and beginning with a branch target or those immediately following a redirect of the branch predictor are assigned to a different op cache pipeline.

In some embodiments, the processor selects the op cache pipeline or pipelines to process a given prediction window based at least in part on specified operation flow criteria that govern one or more aspects of instruction flow through the processor. To illustrate, in some embodiments the operation flow criteria mandates that each op cache access which is available and necessary to satisfy the stream of incoming prediction windows is evenly distributed across the available op cache pipelines. In other embodiments each op cache pipeline of the processor can be assigned a different prediction window, with the different prediction windows including a different number of operations to be provided to the dispatch queue. The operation flow criteria identifies aspects of the number of assigned operations that govern which of the op cache pipelines is to be selected to process the given prediction window in whole or in part. For example, in some embodiments the operation flow criteria mandates that the processor select the op cache pipeline that has been assigned fewer operations to process, thereby balancing the instruction load between the different op cache pipelines. In other embodiments, the operation flow criteria mandates that a minimum or maximum number of operations be provided to one of the op cache pipelines before a prediction window is provided to another of the op cache pipelines. In still other embodiments, the operation flow criteria mandates that prediction windows associated with different threads be provided to different ones of the op cache pipelines.

In some cases, the concurrent processing of different prediction windows results in the op cache or fetch-decode pipelines providing operations out of order relative to an overall program flow. Accordingly, in some embodiments the processor includes a reorder control module to reorder decoded instruction bytes from the different operation pipelines, thereby restoring the program flow prior to the operations being provided to subsequent units of an instruction pipeline.

Turning to the Figures, FIG. 1 illustrates a processor 100 that implements multiple op cache pipelines in accordance with some embodiments. The processor 100 is generally configured to execute sets of instructions (e.g., computer programs) to carry out specified tasks on behalf of an electronic device. Accordingly, in different embodiments the processor 100 is part of one of a variety of electronic devices, such as a desktop computer, laptop computer, server, smartphone, tablet, game console, and the like. It is assumed for purposes of discussion that the processor 100 is a general-purpose processor, such as a central processing unit (CPU). However, in other embodiments the processor 100 is another type of processor, such as a processing unit specially designed to perform operations of a specified type, such as a graphics processing unit (GPU), machine learning processor, and the like.

In the example of FIG. 1, the sets of instructions executed by the processor 100 are represented as instruction stream 101. In particular, the instruction stream 101 is the stream of instructions executed by the processor 100 over a given period of time, and the instructions are therefore associated with one or more computer programs, program threads, and the like. The instruction stream 101 is composed of variable length instructions. That is, the size of one instruction (e.g., the size of the op code and operands associated with the instruction) of the instruction stream 101 is different than the size of at least one other instruction of the instruction stream 101.

To support execution of instructions of the instruction stream 101, the processor 100 includes a fetch-decode pipeline 112 configured to fetch instructions from an instruction cache 110 and to decode each fetched instruction into one or more operations. For example, in the depicted embodiment of FIG. 1, the fetch-decode pipeline 112 includes a fetch unit 120 configured to fetch instructions from the instruction cache 110 and a decode unit 123 to decode the fetched instructions into one or more operations, and to store the operation at a dispatch queue 122. The processor 100 includes additional instruction pipeline units, not illustrated at FIG. 1, including a dispatch unit to dispatch the operations stored at the dispatch queue 122 to a plurality of execution units to execute the operations.

To enhance efficient execution of instructions, the processor 100 employs an operations cache, referred to herein as an op cache 125, that is configured to store previously decoded operations. In some embodiments, the op cache 125 includes a plurality of storage entries, with each entry associated with one or more instruction addresses, and with each entry storing one or more decoded operations associated with the one or more instruction addresses.

As described further herein, the processor 100 includes a control module 106 that is generally configured to receive instruction addresses representing instructions to be decoded. In response to receiving an instruction address, the control module 106 determines if an entry of the op cache 125 is associated with the received instruction address and, if so, assigns an access to an op cache pipeline (126 or 127), which then provides the operations stored at the corresponding entry to the dispatch queue 122 for storage and subsequent provision to the dispatch stage. The processor 100 can thereby provide operations for frequently executed instructions, or instruction sequences, to the dispatch queue 122 relatively quickly, without having to repeatedly fetch and decode these frequently executed instructions or instruction sequences.

If the op cache 125 does not include an entry corresponding to the received instruction address, the control module 106 retrieves the decoded operations for the received instruction address (e.g., from the decode unit 123) and in some embodiments, according to specified op cache allocation and replacement policies, assign the received instruction address to an entry and store the retrieved operations at the assigned entry. The op cache 125 thereby maintains stored operations for a set of instruction addresses based on the specified cache allocation and replacement policies, such as the N most recently received instruction addresses.

The processor 100 is generally configured, as described further herein, to divide the instruction stream 101 into separate streams, and to provide, for each instruction of a stream, decoded operations for dispatch to a set of execution units (not shown). The processor 100 designates an instruction address associated with an initial instruction of the fetch stream, and further designates an end of the fetch stream. In some cases, the end of the fetch stream corresponds to the end of a cache line of the instruction cache 110 that includes the initial instruction. In other embodiments the end of fetch stream corresponds to a defined instruction, such as a branch instruction as described further herein.

To identify the fetch streams, the processor 100 employs a branch predictor 102 that monitors the instruction stream 101 for branch patterns (that is, patterns associated with which branch instructions of the instruction stream 101 are taken or not taken, and under what conditions). As is understood in the art, based on the patterns the branch predictor 102 generates branch predictions indicating the expected outcome of branch instructions of the instruction stream 101. In some embodiments, the branch predictor 102 provides any of three different prediction types: 1) a branch taken prediction, representing a prediction that a branch instruction results in the corresponding branch being taken; 2) a branch not taken prediction, representing a prediction that a branch instruction results in the corresponding branch not being taken; and 3) no prediction representing an indication that the branch predictor has not identified the next branch instruction of the instruction stream 101, and that the instruction flow of the processor 100 should proceed sequentially.

For each branch prediction, the branch predictor 102 generates a corresponding prediction window 104, wherein each prediction window includes 1) a designator (e.g., a pointer) of an initial instruction byte of the window; and 2) a designator of a final instruction byte of the window. Each prediction window 104 thus defines a sequence of instruction bytes between the initial instruction and the final instruction of the window.

The control module 106 of the processor 100 receives the prediction windows 104 from the branch predictor 102, and controls the fetch-decode pipeline 112 and the op cache 125 to generate operations based on the instruction bytes of each of the prediction windows 104. To illustrate, in response to receiving a prediction window, the control module 106 determines if the instruction address for the initial instruction byte of the window corresponds to an entry of the op cache 125. In response to a cache hit (that is, in response to the control module 106 determining that there is an entry matching the instruction address for the initial instruction byte), the control module 106 commands the op cache 125 to provide the operations of the received prediction window, as stored at the corresponding entries, to the dispatch queue 122. In some embodiments, to improve processing efficiency, the control module 106 initiates the fetching and decoding of operations for a prediction window at the fetch-decode pipeline 112 concurrently with determining a cache hit or miss the op cache 125, and halts the fetching and decoding in response to a cache hit at the op cache 125.

To enhance instruction throughput, the op cache 125 includes multiple op cache pipelines (e.g., op cache pipelines 126, 127), wherein each op cache pipeline is configured to independently provide a set of operations from one or more entries of the op cache 125 to the dispatch queue 122. In some embodiments, each of the op cache pipelines includes a read port, or set of read ports, to independently read instruction bytes from op cache 125 entries and provide the read instruction bytes to the dispatch queue 122. The read ports are configured to operate concurrently, so that, for example, each of the op cache pipelines 126 and 127 is able to concurrently provide a set of instruction bytes to the dispatch queue 122.

In some embodiments, the control module 106 is configured to assign, in response to a cache hit for a prediction window, one of the op cache pipelines 126 and 127 to retrieve at least a portion of the instruction bytes for the prediction window from the corresponding op cache entry and provide the retrieved instruction bytes to the dispatch queue 122.

To illustrate, as noted above the prediction windows 104 fall into two types: 1) sequential exit windows having a final instruction byte that corresponds to a defined address or location, such as the end of a cache line, and 2) non-sequential exit windows having a final instruction byte that corresponds to a branch instruction. Further, each prediction window follows either a sequential exit window or a non-sequential exit window. Based on at least a subset of the instructions indicated by the prediction windows 104, the control module 106 identifies a corresponding set of entries of the op cache 125 that store operations corresponding to the subset of instructions. The control module 106 generates a set of op cache accesses, designated op cache accesses 117, to access the entries of the op cache 125. The control module 106 assigns individual ones of the accesses to either of the op cache pipelines 126 and 127 to generate the op streams 115 and 116, respectively. This allows the control module to assign different accesses to different ones of the op cache pipelines 126 and 127.

To illustrate via an example, in some embodiments the control module 106 identifies, for a given prediction window 104, a sequence of four different entries of the op cache 125 that store operations corresponding to instructions of the prediction window. In response, the control module 106 generates the op cache accesses 117 to include a workload of four accesses, one for each entry, and designated for purposes of this example as Access A, Access B, Access C, and Access D. The control module 106 assigns each access to one of the op cache pipelines 126 and 127. Thus, for example, the control module 106 assigns Access A and Access C to op cache pipeline 126 and Access B and Access D to op cache pipeline 127. Each of the op cache pipelines 126 and 127 executes the assigned accesses by retrieving the operations at the op cache entry indicated by the corresponding access. Further, in some embodiments, the op cache pipelines 126 and 127 execute at least some of the assigned accesses concurrently. For example, in some embodiments the op cache pipeline 126 executes Access A concurrently with the op cache pipeline 127 executing Access B. The processor 100 thereby supports increased throughput at the op cache 125.

In some embodiments, the control module 117 generates the op cache accesses 117 to have a specified order, corresponding to a program order of the instruction stream 101. The control module 106 assigns the individual accesses to the op cache pipelines 126 and 127 according to a specified scheme, so that the operations retrieved from op cache 125 are stored at the dispatch queue 125 according to the program order. For example, in some embodiments, the control module 106 is configured to assign, for a given pair of concurrent accesses, the 'older' access (the access corresponding to an operation earlier in the program order) to the op cache pipeline 126 and the younger access (the access corresponding to an operation later in the program order) to the op cache pipeline 127.

In some embodiments, the processor 100 is a multi-threaded processor that concurrently executes multiple threads. In some of these embodiments, the control module 106 assigns accesses for the multiple threads to the op cache pipelines 126 and 127 in alternating fashion. For example, for one cycle, the control module 106 assigns accesses for a given thread to the pipelines 126 and 127, the accesses executing concurrently at the different pipelines. For the next cycle, the control module 106 assigns accesses for a different thread to the pipelines 126 and 127, the accesses again executing concurrently at the different pipelines.

In other embodiments, the control module 106 assigns accesses to the pipelines 126 and 127 for different threads based on a set of flow constraints or criteria, designated op flow criteria 108. The op flow criteria 108 is a data structure that is stored in a memory or other storage component (not shown) of the processor 100, and in some embodiments is generated, for example, during testing and development of the processor 100 to ensure efficient processor operation. In other embodiments, the op flow criteria 108 is generated by an operating system executing at the processor 100 and is adjustable or programmable by a user of the electronic device that incorporates the processor 100.

In some embodiments, the control module 106 implements an instruction flow policy based in part on fixed policy constraints to prevent execution errors at the processor 100 and in part on the criteria set forth by the operation flow criteria 108. The control module 106 first ensures that the fixed policy constraints are met. Once those constraints are satisfied, the control module 106 employs the op flow criteria 108 to enhance instruction throughput at the processor 100.

In different embodiments, the op flow criteria 108 indicates factors such as downstream resource availability, thread fairness criteria, quality of service settings, and the like or any combination thereof. An operating system or other program sets the op flow criteria 108 to govern the flow of accesses provided to the pipelines 126 and 127. Thus, for example, in some embodiments the operating system sets the op flow criteria 108 so that the control module 106 provides all accesses for a specified thread to a specified set of op cache pipelines. In other embodiments, the operating system sets the op flow criteria 108 so that the control module 106 assigns for each of a set of specified time slices (e.g., each clock cycle) all accesses of a single thread per timeslice to the pipelines 126 and 127, and the control module 106 selects which thread to assign in a particular timeslice based on flow considerations or constraints indicated by the operating system. In other embodiments, the control module 106 assigns accesses from different threads dynamically across different op cache pipelines based upon flow considerations or constraints indicated by the operating system. The operating system can thereby enforce any of a variety of thread flow control schemes.

In some embodiments, based on the op flow criteria 108, the control module 106 selects an op cache pipeline to process a branch stream based at least in part on the relative workload pending at each of the plurality of op cache pipelines. To illustrate, in some embodiments each of the op cache pipelines 126 and 127 includes one or more queues, such as an input queue, to store the operations to be provided via the corresponding read port. Based on the fullness of these one or more queues, the control module 106 determines the relative workload pending at each of the op cache pipelines 126 and 127. In response to receiving a prediction window from the branch predictor 102, and assuming that the fixed constraints are satisfied, the control module 106 assigns the corresponding fetch stream to the op cache pipeline having the lower workload (i.e. the op cache pipeline have less pending work).

In some embodiments, the configuration of the op cache pipelines 126 and 127 is such that it is more efficient to assign a threshold number of prediction windows to one pipeline before assigning prediction windows to the other. Accordingly, in these embodiments, and based on the operation flow criteria 108, the control module 106 selects one of the op cache pipelines 126 and 127 to process (that is, provide operations for) prediction windows until the number of pending operations at the selected pipeline exceeds a threshold. The control module 106 then begins assigning prediction windows to the other of the op cache pipelines 126 and 127.

In some embodiments, the op cache pipelines 126 and 127 are configured such that processing efficiency is reduced once a threshold maximum number of prediction windows have been assigned to one pipeline. Accordingly, in these embodiments, and based on the operation flow criteria 108, the control module 106 selects one of the op cache pipelines 126 and 127 to process prediction windows until the threshold maximum number of pending instructions at the selected pipeline is reached. The control module 106 then begins assigning prediction windows to the other of the op cache pipelines 126 and 127.

In some embodiments, the prediction windows to be processed by the op cache pipelines 126 and 127 are associated with different program threads executing at the processor 100. That is, the instructions for one prediction window are instructions of one thread while the instructions of another prediction window are instructions of another thread. In these embodiments, the control module 106 assigns prediction windows to the op cache pipelines 126 and 127 based in part on the thread associated with each prediction window. For example, in some embodiments each thread is associated with a quality of service (QoS) level set by an operating system executing at the processor 100. The control module 106 selects the op cache pipeline to process a given prediction window based on the QoS level of the thread associated with the given prediction window, as well as the QoS level of threads associated with the prediction windows being processed at the op cache pipelines 126 and 127. For example, in some embodiments the control module 106 assigns prediction windows to the op cache pipelines 126 and 127 so that the prediction windows of a thread having a higher QoS are not blocked by the prediction windows of a thread having a lower QoS level, such as by assigning all prediction windows of a thread having the higher QoS to the op cache pipeline 126 and assigning all prediction windows of threads having lower QoS levels to the op cache pipeline 127.

Figure 2:
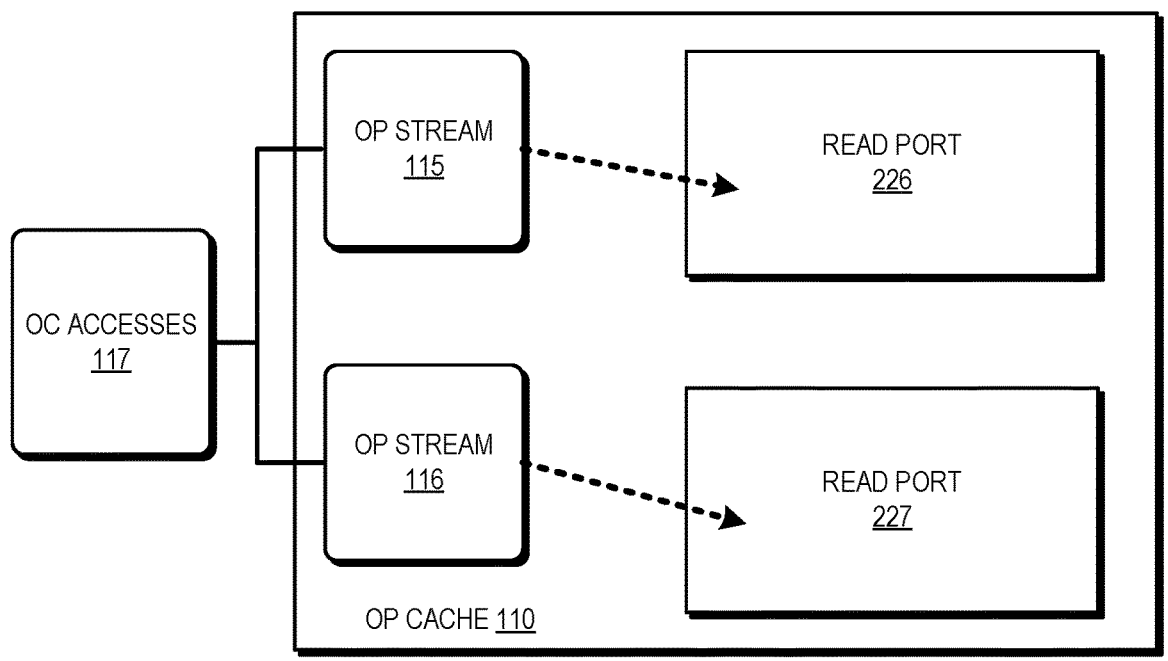
FIG. 2 is a block diagram illustrating an example of the processor of FIG. 1 providing different operations to a dispatch queue via different ones of the plurality of op cache pipelines in accordance with some embodiments.

FIG. 2 is a block diagram illustrating an example of the control module 106 assigning the op streams 115 and 116 to op cache pipelines in accordance with some embodiments. In the depicted example, it is assumed that each of the op streams 115 and 116 correspond to a different set of prediction windows. In addition, in the depicted example, the op cache 125 includes two different read ports, designated read port 226 (corresponding to op cache pipeline 126 of FIG. 1) and read port 227 (corresponding to op cache pipeline 127 of FIG. 1). In the example of FIG. 2, the control module 106 selects the read port 226 to provide the operations for the op stream 115. Accordingly, the control module 106 commands the op cache 125 to provide the stored operations for the op stream 115 to the dispatch queue 122 via the read port 226. Similarly, the control module 106 commands the op cache 125 to provide the stored operations for the op stream 116 via the read port 227. In some embodiments, the op cache 125 provides at least one operation of the op stream 115 via the read port 226 concurrently with providing at least one operation of the op stream 116 via the read port 227.

In some embodiments, the op streams 115 and 116 are generated by the control module 106 at the granularity of op cache entry reads, such that the op streams 115 and 116 correspond to the same prediction window, and control module 106 assigns op cache entry reads to the op streams 115 and 116 based on an ordered set of total op cache accesses. To illustrate via an example, a given prediction window PW0 corresponds to three op cache entries, requiring three op cache accesses designated PW0A0, PW0A1, and PW0A2. The following prediction window PW1 corresponds to a single op cache entry, requiring one op cache access designated PW1A0. The control module 106 assigns the accesses PW0A0 and PW0A2 to the op stream 115 and assigns the accesses PW0A1 and PW1A0 to the op stream 116. Accordingly, the accesses PW0A0 and PW0A1 are executed concurrently (e.g., during the same clock cycle) and the accesses PW0A2 and PW1A0 are executed concurrently (e.g., during the subsequent clock cycle).

Figure 3:
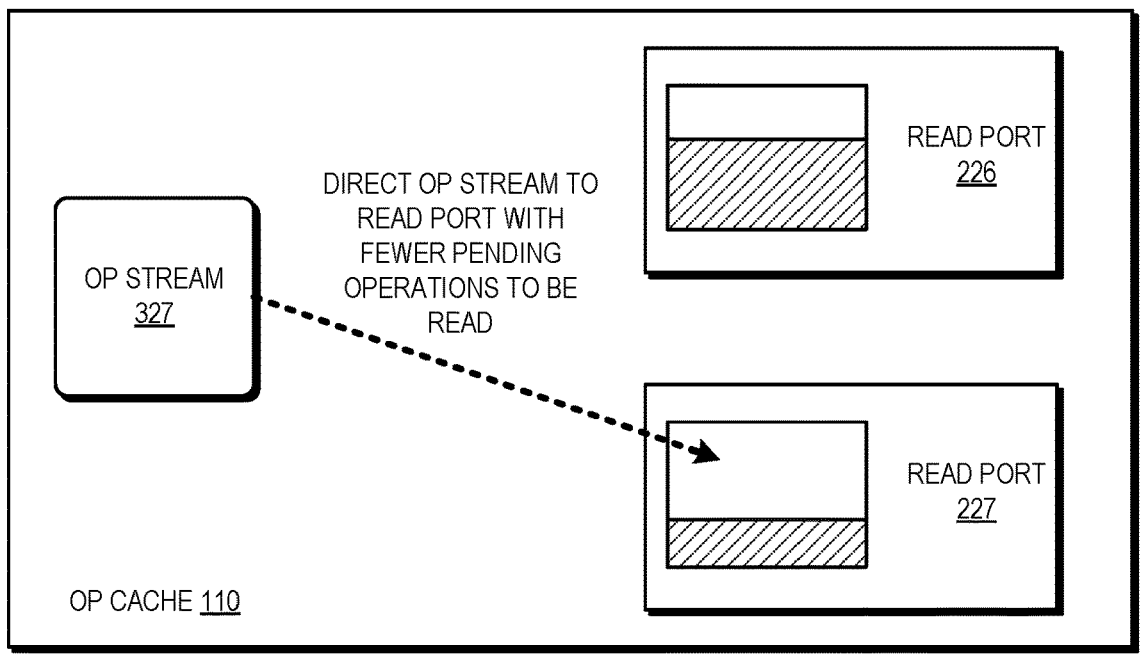
FIG. 3 is a block diagram illustrating an example of the processor of FIG. 1 selecting one of the plurality of op cache pipelines to provide operations based on a relative fullness of corresponding read ports in accordance with some embodiments.

As noted above, in some embodiments the operation flow criteria 108 indicate that the control module 106 is to assign op streams to the op cache pipelines 126 and 127 based on the relative workload at each pipeline. An example is illustrated at FIG. 3 in accordance with some embodiments. In the example of FIG. 3, the control module 106 monitors the fullness of the input queues of the read ports 226 and 227 respectively. In the depicted example, the input queue for the read port 226 is fuller than the input queue for the read port 227. That is, the read port 226 has more operations awaiting provision to the dispatch queue 222 than does the read port 227, indicating that the op cache pipeline 126 has a greater overall workload than does the op cache pipeline 127. Accordingly, in response to receiving from the branch predictor 102 an indicator of an op stream 327 corresponding to a prediction window, the control module 106 selects the read port 227 to provide the operations associated with the op stream 327. The control module 106 thereby balances the overall workload of the op cache 125 between the op cache pipelines 126 and 127.

Figure 4:
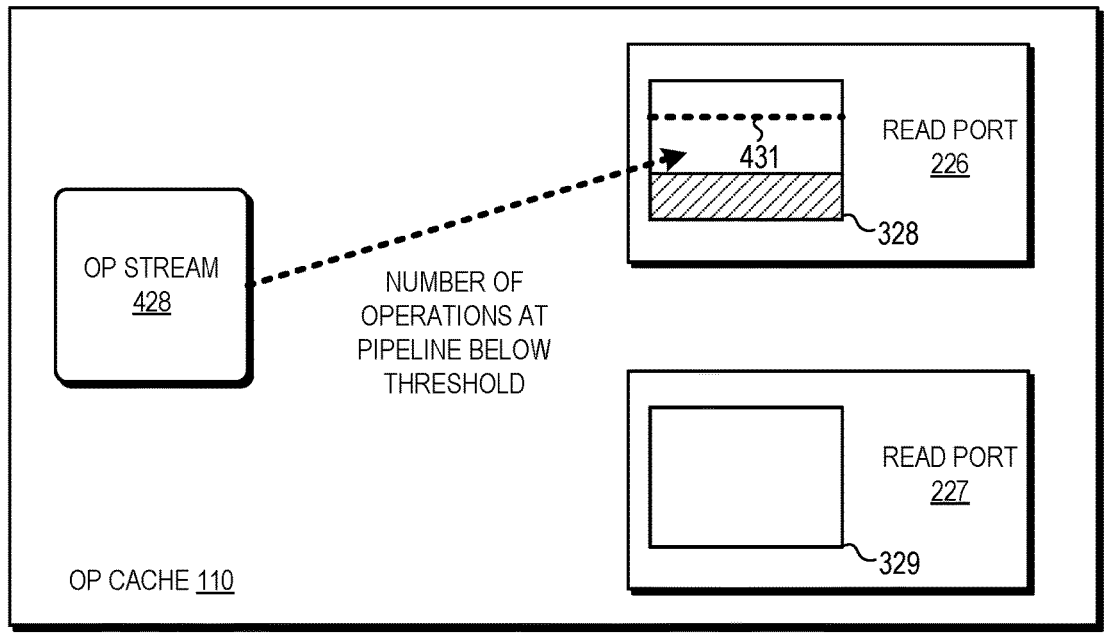
FIG. 4 is a block diagram illustrating an example of the processor of FIG. 1 selecting one of the plurality of op cache pipelines to provide operations based on the fullness associated with a read port being below a threshold in accordance with some embodiments.

In some embodiments the operation flow criteria 108 indicate that the control module 106 is to assign op streams to the op cache pipeline 226 until the workload at the pipeline 226 is at or above a minimum threshold. An example is illustrated at FIG. 4 in accordance with some embodiments. In the example of FIG. 4, the control module 106 monitors the fullness of the input queue of the op cache pipeline 226 and compares the fullness to a threshold 431. In the depicted example, the fullness of the input queue has not reached the threshold 431. That is, the input queue 224 has fewer operations awaiting processing than the number of operations indicated by the threshold 431. Accordingly, in response to receiving from the branch predictor 102 an indicator of an op stream 428, the control module 106 selects the op cache pipeline 226 to process the op stream 428.

Figure 5:
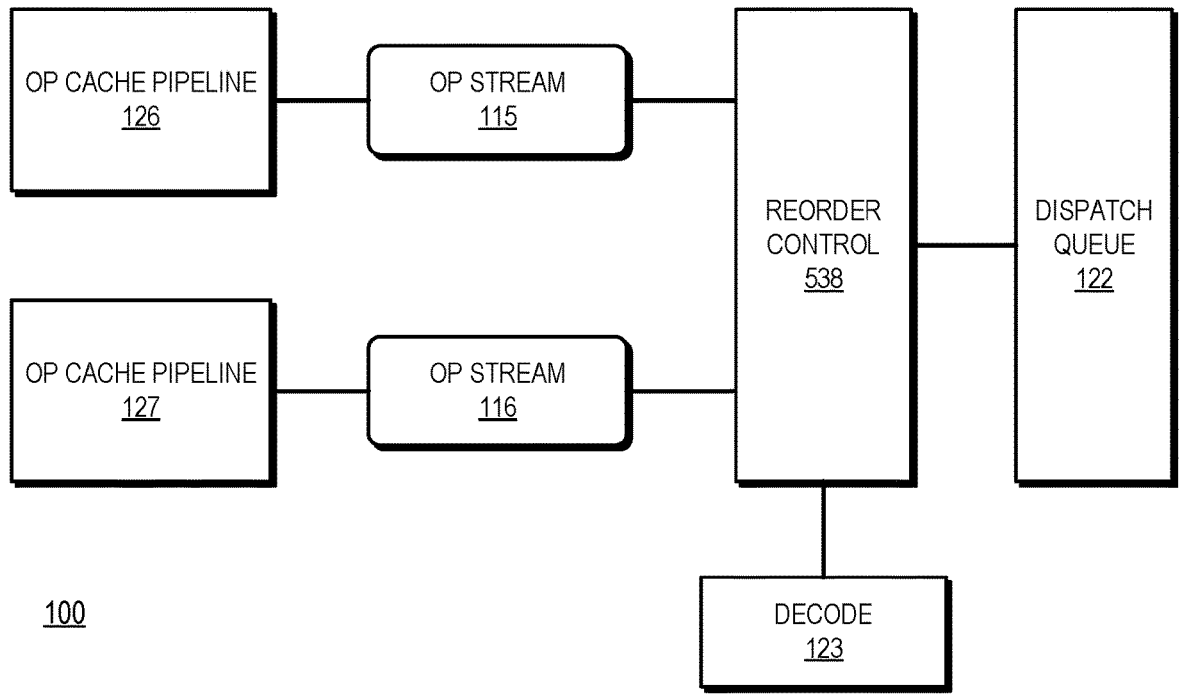
FIG. 5 is a block diagram of the processor of FIG. 1 including a reorder control module to reorder operations received from the plurality of op cache pipelines in accordance with some embodiments.

In some embodiments, the control module 106 assigns op streams to the op cache pipelines 126 and 127 such that instructions are processed out of order relative to an overall program flow associated with the instruction stream 101. In some cases, such out-of-order processing of instructions causes errors in other portions of the processor 100, such as at one or more execution units of the processor 100. Accordingly, in some embodiments the processor 100 includes elements to restore the order of instructions after the op cache pipelines 126 and 127. An example is illustrated at FIG. 5 in accordance with some embodiments. In the depicted example, the processor 100 includes a reorder control module 538 placed between the op cache pipelines 126 and 127 and the dispatch queue 122.

It will be appreciated that while the above examples of op flow criteria have been described with respect to a single factor, in some embodiments the control module 106 employs multiple factors to determine how to assign op cache accesses to the different op streams. Thus, for example, in some embodiments the control module 106 assigns op cache accesses to an op cache stream based on a combination of two or more factors such as quality of service information for different executing threads, buffer fullness, threshold numbers of accesses assigned to a given stream, and the like.

In operation, the op cache pipelines 126 and 127 retrieve the operations for the op streams 115 and 116 respectively. As noted above, in some cases the pipelines 126 and 127 generate these operations out of order relative to the overall program flow of the instruction stream 101. The reorder control module 538 is configured to reorder the operations generated by the op cache pipelines 126 and 127 to restore the original order of the instruction stream 101. For example, in some embodiments, the reorder control module 538 reorders the operations so that the sequence of the reordered operations correspond to the sequence that would have resulted if the operations had been provided by a single op cache pipeline (referred to as the specified instruction sequence). In still other embodiments, the reorder module 538 receives decoded instructions both from the op cache pipelines 126 and 127 and from the decode unit 123, and re-orders the received decoded instructions according the specified instruction sequence. Thus, in some embodiments the specified instruction sequence includes both operations received from the op cache 106 and from the decode unit 123). The reorder control module 538 provides the reordered operations to the dispatch queue 122. A dispatch unit retrieves the reordered operations in the reordered sequence and dispatches each operation to a corresponding execution unit (not shown) of the processor 100.

In different embodiments, the reorder control module 538 includes different reordering structures. For example, in some embodiments the reorder control module includes a first-in first-out (FIFO) buffer that restores the ordering of operations received from the op cache pipelines 126 and 127 and from the decode unit 123. In other embodiments, the reorder control module 538 includes a separate FIFO buffer for each of the op cache pipelines 126 and 127 and a FIFO buffer for the decode unit 123, and also includes a reordering sequence FIFO buffer that stores control information such as one or more of: an instruction or block sequence number for each operation, the FIFO buffer that stores the block start operation (that is, the FIFO buffer that stores the operation corresponding to the initial instruction of a fetch window), the FIFO start entry address (that is, the address of the FIFO buffer entry that stores the operation corresponding to the initial instruction of a fetch window), the FIFO end entry address (that is, the address of the FIFO buffer entry that stores the operation corresponding to the last instruction of a fetch window), the number of entries for the fetch block in the corresponding FIFO buffer, and the like, or any combination thereof. Control circuitry of the reorder control module 538 employs this control information to restore the order of the operations stored at the separate FIFO buffers.

In other embodiments, the reorder control module 538 includes a FIFO buffer that stores the oldest, reordered set of operations at the FIFO write time, and further includes another FIFO buffer that stores other younger blocks of operations from any of the plurality of op cache pipelines. The reorder control module 538 further includes a reordering sequence FIFO buffer that stores control information such as one or more of an instruction or block sequence number, the FIFO that stores the fetch window start, The FIFO entry start address, the FIFO entry end address, and the number of entries for the fetch window in the corresponding FIFO buffer. Control circuitry of the reorder control module 538 employs this control information to restore the order of the operations stored at the separate FIFO buffers.

In still other embodiments, each prediction window is associated with an identifier, such as a sequence number. The reorder control module 538 includes a storage structure having multiple entries, wherein an entry addressed by the branch prediction identifier stores one or more of an indicator of a set of predictions that begins with the corresponding branch prediction window, the size of the branch prediction window, and a pointer to the set of operations associated with the next branch prediction window of the instruction stream 101. In still other embodiments, the reorder control module 538 employs a linked list of descriptors that identify the correct sequence of decoded operations. The reorder control module 538 employs this sequencing information to restore the received operations to the sequence indicated by a program flow of the instruction stream 101.

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   in response to a first branch prediction at a processor:
      selecting a first op cache pipeline of a plurality of op cache pipelines of the processor, wherein the op cache pipelines provide decoded instructions to op cache entries, wherein selecting the first op cache pipeline further comprises selecting the first op cache pipeline based on operation flow criteria associated with the plurality of op cache pipelines, wherein the operation flow criteria specify selecting the first op cache pipeline based on at least two quality of service levels, including at least one quality of service level of a thread being processed by at least one of the plurality of op cache pipelines; and
      providing a first set of operations associated with the first branch prediction to a dispatch stage of the processor via the selected first op cache pipeline.

2. The method of claim 1, wherein the operation flow criteria includes a quality of service associated with at least one thread executing at the processor.

3. The method of claim 1, wherein the operation flow criteria indicates which thread of a plurality of executing threads is to be assigned to the plurality of op cache pipelines for each of a plurality of time slices.

4. The method of claim 1, wherein the operation flow criteria include a number of prediction windows provided to the first op cache pipeline prior to the selecting.

5. The method of claim 4, wherein the operation flow criteria include a minimum number of prediction windows expected to be provided to each of the plurality of op cache pipelines.

6. The method of claim 4, wherein the operation flow criteria include a maximum number of prediction windows expected to be provided to each of the plurality of op cache pipelines.

7. The method of claim 1, wherein each of the plurality of op cache pipelines includes a different read port of an op cache of the processor.

8. The method of claim 1, further comprising:
   determining the first set of operations based upon a first operation and a last operation indicated by the first branch prediction; and
   reordering the first set of operations after the first set of operations are generated, the reordering based on a program sequence identified at the processor.

9. The method of claim 1, wherein selecting the first op cache pipeline further comprises selecting the first op cache pipeline based on the first branch prediction.

10. The method of claim 1, wherein the operation flow criteria specify selecting the first op cache pipeline based on a first quality of service level and selecting a second op cache pipeline based on a second quality of service level lower than the first quality of service level.

11. The method of claim 10, wherein the operation flow criteria specify selecting the first op cache pipeline for prediction windows of a first thread having a first quality of service level and selecting a second op cache pipeline for prediction windows of a second thread having a second quality of service level lower than the first quality of service level.

12. A method comprising:
in response to a identifying a branch prediction at a processor:
selecting one of a plurality of op cache pipelines of the processor based on the branch prediction and at least two quality of service levels, including at least one quality of service level of a thread being processed by at least one of the plurality of op cache pipelines, each of the plurality of op cache pipelines associated with a different read port of an op cache of the processor, wherein the op cache pipelines provide decoded instructions to op cache entries; and
providing a set of operations associated with the branch prediction to a dispatch stage of the processor via the selected op cache pipeline.

13. A processor comprising:
a branch predictor to generate a first branch prediction;
a dispatch queue;
a plurality of op cache pipelines, wherein the op cache pipelines provide decoded instructions to op cache entries;
a control module to select a first op cache pipeline of the plurality of op cache pipelines of the processor, wherein the control module is to select the first op cache pipeline based on operation flow criteria associated with the plurality of op cache pipelines, and wherein the operation flow criteria specify selecting the first op cache pipeline based on at least two quality of service levels, including at least one quality of service level of a thread being processed by at least one of the plurality of op cache pipelines; and
wherein the selected op cache pipeline is to provide operations associated with the first branch prediction to the dispatch queue.

14. The processor of claim 13, wherein the operation flow criteria includes a first amount of operations assigned to the first op cache pipeline.

15. The processor of claim 14, wherein the operation flow criteria includes a second amount of operations assigned to a second op cache pipeline of the plurality of op cache pipelines.

16. The processor of claim 15, wherein the operation flow criteria include a number of prediction windows provided to the first op cache pipeline prior to the selecting.

17. The processor of claim 16, wherein the operation flow criteria include a minimum number of prediction windows expected to be provided to each of the plurality of op cache pipelines.

18. The processor of claim 16, wherein the operation flow criteria include a maximum number of prediction windows expected to be provided to each of the plurality of op cache pipelines.

19. The processor of claim 13, further comprising:
a reorder module to reorder the operations provided via the first op cache pipeline, the reordering based on a program sequence identified at the processor.

* * * * *